Patented July 5, 1932

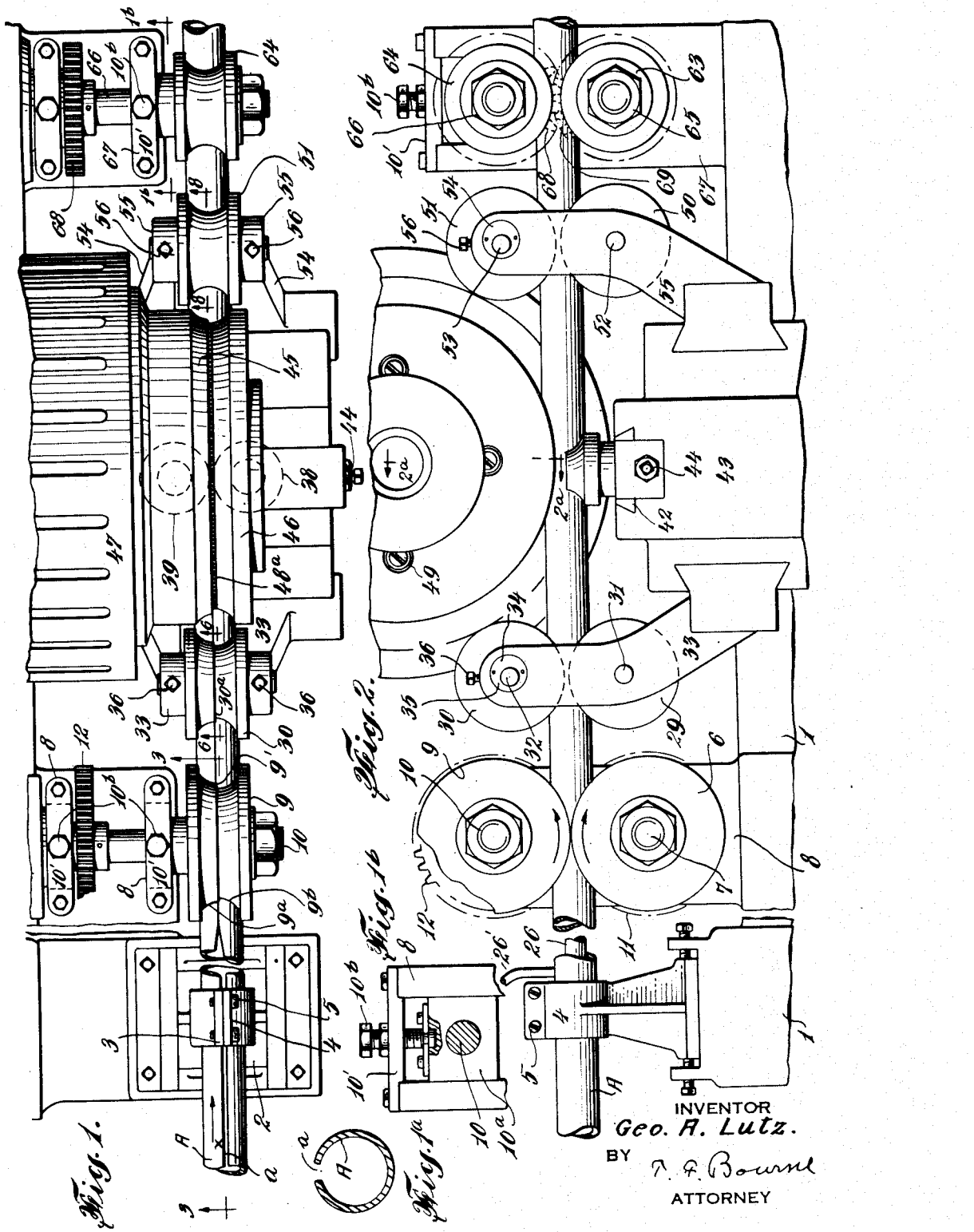

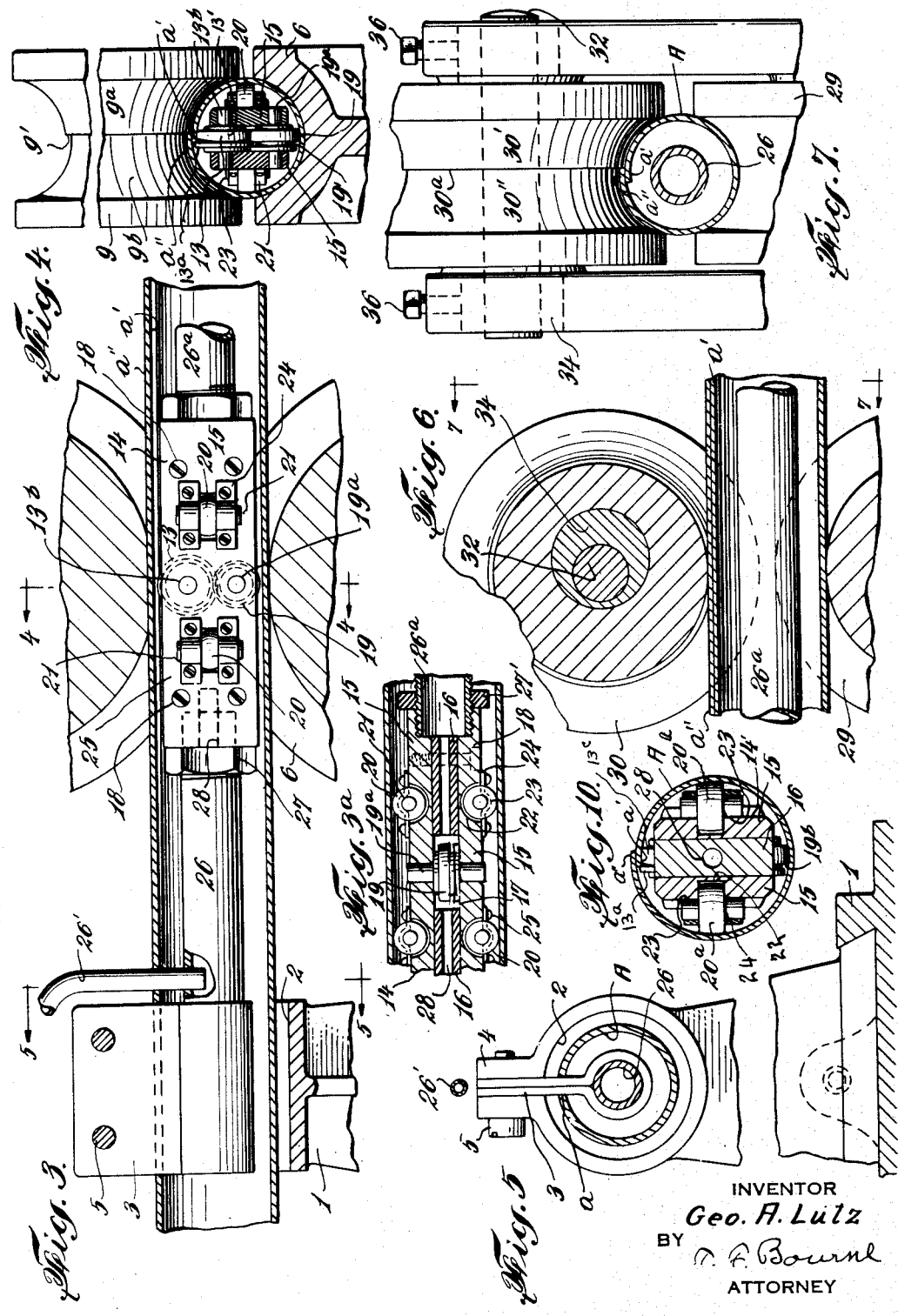

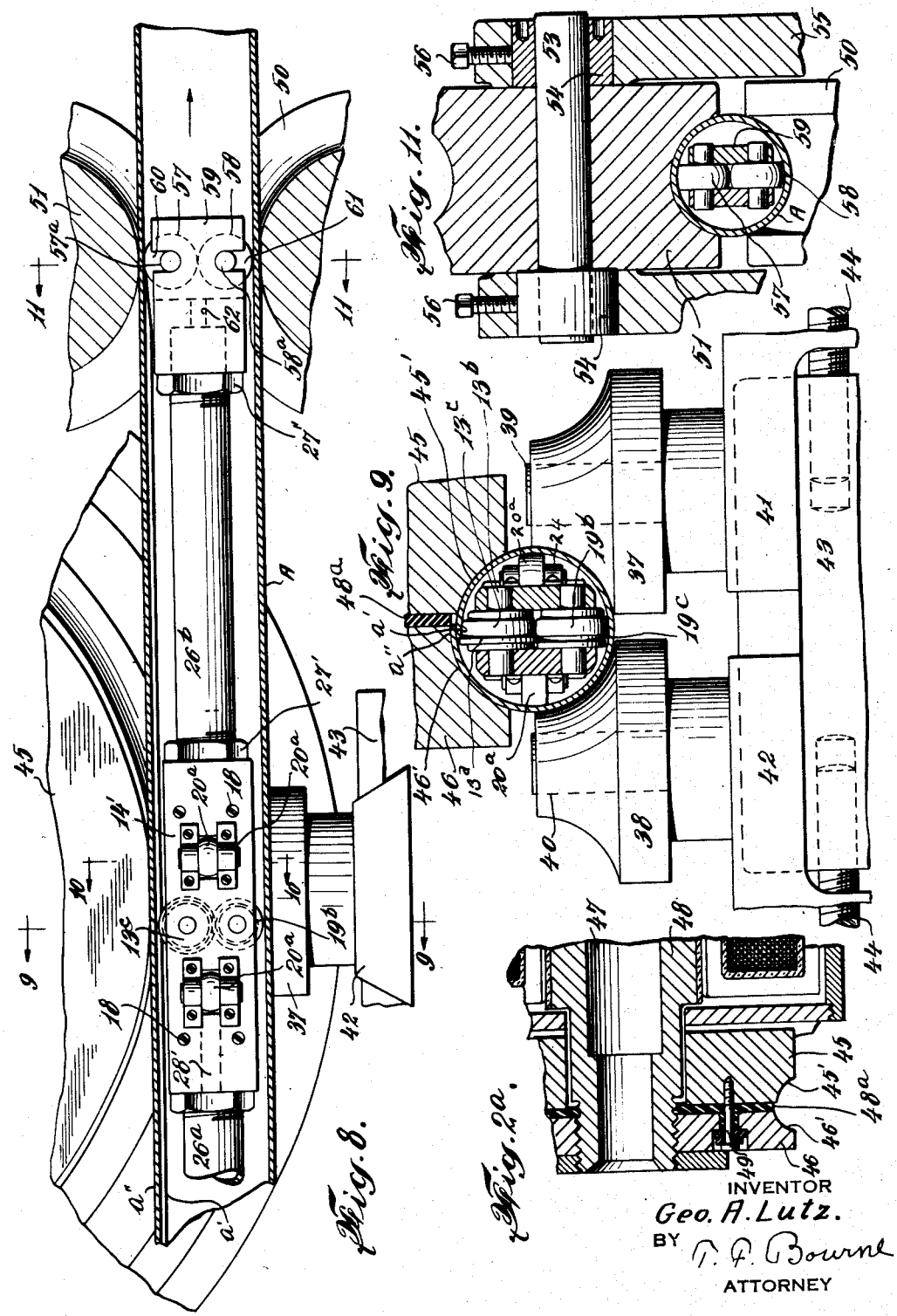

1,865,531

UNITED STATES PATENT OFFICE

GEORGE A. LUTZ, OF CRANFORD, NEW JERSEY, ASSIGNOR TO AMERICAN CIRCULAR LOOM COMPANY, INC., OF DOVER, DELAWARE, A CORPORATION OF DELAWARE

MEANS FOR LAP-WELDING

Original application filed March 10, 1930, Serial No. 434,496. Divided and this application filed April 23, 1930. Serial No. 446,463.

The object of my invention is to weld together the overlapping marginal portions of a tubular metal blank for the production of a lap-weld, and to compress or iron down the heated overlapped portions of the blank to a thickness substantially approximating the gage of the metal, whereby I produce a lap-welded tube having substantially smooth exterior and interior surfaces along the weld.

In carrying out my invention I cause the adjacent marginal portions of a tubular metal blank to be overlapped, traverse the tube, and guide the edges of the lapped portions thereof (to retain them in desired lapped relation) to a heating or welding place where the overlapped edges are heated sufficiently for welding them together. I compress said overlapped portions while they are retained at a welding temperature as the tube traverses, and preferably reduce said portions substantially to the gage of the metal of the blank, thereby substantially eradicating the appearance of a lapped seam and providing the exterior and interior surfaces of the finished tube along the weld in a smooth condition.

In the embodiment of my invention herein set forth I provide, at the welding place, a pair of spaced rotary electrodes insulated from each other, and of different diameters at the surfaces that contact with the tubular blank adjacent to the lapped portions thereof. Within the blank I provide means to bear against the interior surface thereof, in opposition to one of the electrodes, with a rib or shoulder to bear against the edge of the inner lapped portion of the blank, whereby said inner portion is guided and kept from displacement.

Exterior guiding means for the tube blank also is provided adjacent to the welding place. The electrodes are to be supplied with current of suitable amperage to effect the desired heating of the lapped portions of the blank.

At a suitable point in advance of the welding place I provide lapping means for the blank so constructed, in the nature of a pass or throat, as to cause the marginal portions of the tubular blank to be offset or displaced with respect to one another and to be overlapped, so that such overlapped portions of the blank will proceed to the welding place. Said lapping means also serves to compress the lapped marginal portions of the blank to provide a substantially definite thickness of said lapped portions for passage to the electrodes. On the opposite side of the welding place I provide compressing means for the heated overlapped portions of the blank, in the nature of a pass or throat, to compress said portions and reduce them to a desired thickness, such as substantially the same as the gage of the blank, thereby producing substantially smooth surfaces along the weld on the exterior and interior of the welded tube.

My invention comprises novel details of improvement that will be hereinafter set forth and then pointed out in the claims.

Reference is to be had to the accompanying drawings in which:—

Fig. 1 is a plan view of a welding machine embodying my improvements;

Fig. 1a is a detail end view of a tube blank;

Fig. 1b is a sectional detail;

Fig. 2 is a side view of Fig. 1;

Fig. 2a is a detail section on line 2a, 2a, in Fig. 2;

Fig. 3 is an enlarged section substantially on line 3, 3, in Fig. 1;

Fig. 3a is a sectional detail of part of Fig. 3;

Fig. 4 is a cross section on line 4, 4, in Fig. 3;

Fig. 5 is a cross section on line 5, 5, in Fig. 3;

Fig. 6 is an enlarged section on line 6, 6, in Fig. 1;

Fig. 7 is a cross section on line 7, 7, in Fig. 6;

Fig. 8 is an enlarged section on line 8, 8, in Fig. 1;

Fig. 9 is a cross section on line 9, 9, in Fig. 8;

Fig. 10 is a cross section on line 10, 10, in Fig. 8; and

Fig. 11 is an enlarged cross section on line 11, 11, in Fig. 8.

Similar numerals of reference indicate corresponding parts in the several views.

At 1 is a main frame which may be of any suitable construction. At 2 is indicated a support for the passage of a tubular metal blank A which has an open seam at a. The support 2 is upon the main frame, and at 3 is a guiding member having a position within the support 2 and extending through the seam a to keep its edges spread apart and guide the blank as the latter traverses through the machine. The support 2 is shown split at the upper part 4 to receive the member 3 and clamped against the latter by means of screws 5 Figs. 1 and 5. At a suitable distance from the support 2 feeding or traversing means for blank A are provided, which also serve to displace the blank from its normal circular condition at the seam portion and to overlap the marginal portions of the blank. A grooved blank guiding roller is indicated at 6, shown secured upon a shaft 7 that is carried by supports 8 on the main frame, (Fig. 1, 2 and 4), upon which roller the tube blank is guided as it proceeds from the support 2. Suitably spaced from the roller 6 is a grooved roller 9, said rollers providing a pass for the tube blank. The roller 9 is secured to a shaft 10 journaled on the supports 8. The shafts 7 and 10 are provided with intermeshing gears at 11, 12, causing rotation of said rollers 6 and 9 together, (Fig. 2). Either of said shafts may be driven by any suitable means.

The roller 9 is provided at its grooved portion with closely adjacent tube-blank engaging surfaces 9a and 9b, of different diameters, providing an annular shoulder or rib 9' between said surfaces, (Figs. 1 and 4). As said rollers are rotated in contact with the tube blank the latter will be fed forwardly toward welding devices. The edge of the outer portion a" of the blank will bear against the shoulder 9', Fig. 4. The groove of roller 6 and the grooved portion of the roller 9 having the less diameter at 9b may be substantially in the radius of the tube blank from its longitudinal axis, whereas the greater diameter of the surface 9a is on a different radius from that of the other surface of the roller 9, thereby reducing the area of the pass, with respect to the normal cross-sectional area of the tube blank, sufficiently to permit displacement of the marginal portion a' of the blank from its normal circular condition. The arrangement is such that as the tube blank travels between the rollers 6 and 9 the marginal portion a' of the blank will be gradually displaced or depressed inwardly, and will be caused to fold or tuck under the marginal portion a", by reason of the reduced throat area, as indicated in Fig. 1. In order to cause the inwardly pressed marginal portion a' of the tube blank to be properly guided, and to prevent said portion from being pressed inwardly too far I provide means within the tube blank to engage the latter and the edge of the portion a', as indicated in Figs. 3 and 4. At 13 is a roller within the blank and opposed to the roller 9, the roller 13 having one portion at 13' of less diameter than another portion 13a. The portion 13' of the roller is adapted to bear against the inset portion a' of the tube blank, as indicated in Fig. 4. The roller portion 13a serves as an annular outwardly extending shoulder adapted to engage the radial edge of the marginal portion a' of the tube blank to guide the latter, whereby the co-operation of the portions 13' and 13a of roller 13 with the marginal and edge portions of the tube blank keep the latter in desired position at the same time that the shoulder 9' of the roller 9 keeps the edge of the portion a" of the blank in required position. The devices described pre-set the tube blank with its marginal portions in overlapped relation.

The roller 13 is journaled on a frame 14 maintained within the tube blank between the rollers 6 and 9. The frame I have illustrated comprises two side bars 15 of suitable length, spaced apart by blocks 16 that are spaced from each other to provide an opening 17 within which the roller 13 is located, Fig. 3a. The parts 15 and 16 are secured together by means of screws 18. The bars 15 are provided with holes in which the pivots 13b of the roll 13 are journaled. Below the roll 13 is another roll 19 having its pivots 19a journaled in holes in the side bars 15 of frame 14, the roll 19 being adapted to bear against the inner surface of the tube blank, as indicated in Fig. 4, the periphery of roll 19 suitably conforming to the curvature of the blank A. The roll 19 is provided with a peripheral groove 19' receiving the portion 13a of roll 13, Fig. 4. The relation of the parts is such that as the tube blank A travels between the rollers 6 and 9 the rolls 13 and 19 engage the corresponding inner surfaces of the blank, whereby the compression pressure of the roll 9 upon the marginal portions of the tube blank will be resisted by the rolls 13 and 19 and the roller 6. In order to keep the frame 14 in proper position in a lateral direction within the tube blank I provide said frame with horizontally disposed outwardly projecting rolls 20, shown provided with vertically extending pivots 21, (Fig. 3a). The bars 15 are shown provided with radially disposed recesses 22 in which the rolls 20 are received, and said bars also have seats at 23, above and below the recesses 22, in which the pivots 21 are rotatively seated.

Straps 24 are secured by screws 25 to the outer sides of the bars 15 in front of the pivots 21, whereby the latter are journaled between the seats 23 and said straps. The rollers 20 are in such position as to engage opposite sides of the inner surface of the tube blank to keep the rolls 13 and 19 in proper position. The frame 14 is supported within the tube blank by contact of the roller 19 with the latter that rests upon the roller 6, and said frame is guided or retained in position by an arm or bar 26 that is shown secured in the member 3 and projects therefrom toward said rolls. The bar 26 is shown secured to the frame 14 by means of screw threads and a securing nut 27, whereby the position of said frame may be adjusted longitudinally of the tube blank for registering the rolls 13 and 19 with their axes in the desired vertical plane, substantially in the axes of the rolls 6 and 9, (Fig. 3). By preference the arm 26 is tubular and receives a tube 26′ from a source of water supply to furnish water through said arm into the tube blank for cooling the rollers therein. The block 16 is shown provided with a bore 28 through which water may pass into space 17 and thence into the tube blank. The pressure of the rollers 6 and 9 may be varied as desired. The shaft 10 is shown journaled in bearing blocks 10a guided in the supports 8, the blocks being provided with adjusting screws 10b, swiveled in said blocks and operative in caps 10′ secured on the supports 8, (Figs. 1 and 1b). Desired pressure of the rollers 9 and 13, on and in a plane through the lapped marginal portions a′ and a″ of the blank A, may be effected by adjustment of the screws 10b, whereby a substantially definite or fixed thickness of said lapped portions may be produced, in the nature of a cold-rolling of said portions, as the blank travels toward the heating place.

At 29 and 30 are spaced peripherally grooved guiding rolls, spaced from the rollers 6 and 9, providing a guiding pass for the tube blank having the pre-set lapped marginal portions a′, a″. Said rolls have shafts 31 and 32 journaled in supports 33 on the main frame. At least one of said shafts may be adjustable from and toward the tube blank for which purpose I have shown the shaft 32 journaled eccentrically in rotatively adjustable bearing blocks 34 set in bores 35 in the supports 33 and adapted to be retained in adjusted position by screws 36 (Figs. 2 and 7), whereby desired pressure of the rolls 29 and 30 on the pre-set tube blank may be adjusted and maintained. The roll 30 is shown provided with surfaces 30′ and 30″ of different diameters providing an annular shoulder at 30a. The greater diameter surface 30′ bears against the inset portion of the tube blank and the lesser diameter surface 30″ bears against the normal surface of the tube blank, so that the edge of the overlapping marginal portion a″ of the blank engages the shoulder 30a, whereby the pre-set form of the overlapped marginal portions of the tube blank are retained as the latter travels and is guided.

At a suitable distance from the tube blank pre-setting devices described, and from the guiding rolls 29 and 30, are located means for heating the overlapped marginal portions of the tube blank for welding them together. I have illustrated electric heating means for the overlapped portions of the blank, and means within the blank to retain the same in its pre-set form. At the heating place guiding means for the tube blank are provided. I have shown said means comprising grooved rollers 37 and 38 journaled upon pivots 39 and 40 carried by blocks 41 and 42. The blocks 41 and 42 are shown guided for lateral adjustment on a member 43 of the main frame and provided with screws 44 cooperative with the parts 41, 42 and 43 for adjusting said rolls radially as required (Figs. 2 and 9).

Above the rolls 37 and 38 are rotary electrodes 45 and 46, shown having grooved peripheries to engage the corresponding portions of the tube blank. The electrodes 45 and 46 are spaced apart and insulated from each other and may be supplied with electric current in any desired way. I have illustrated said electrodes in connection with a welding machine of the rotary transformer class, such as illustrated in Letters Patent to me #1,594,891, granted August 3, 1926, and in Letters Patent #1,478,262 issued December 18, 1923, to Snodgrass and Hunter. At 47 is illustrated a portion of a transformer of the rotary secondary type, to the secondary 48 of which transformer the electrodes 45 and 46 are connected in a well known way, (Figs. 1 and 2a). The electrodes are spaced apart by suitable insulation at 48a, and are connected together by insulated screws 49 in a well known way. The electrodes have suitably curved contact surfaces adapting said surfaces to properly contact with the adjacent portions of the tube blank A, as indicated in Fig. 9. For such purpose the electrode 45 is shown provided with a groove having a surface 45′ of greater diameter, to engage the inset portion of the tube blank, than the corresponding diameter 46′ of the electrode 46, which engages the outer lapped portion of the tube blank, as indicated in Figs. 2a and 9. The spacing between the electrodes is such that the edge of the outer or overlapped portion a″ of the blank will not engage the electrode 45. The current supplied by the transformer for the electrodes will traverse from one electrode to the other through the metal in contact at the overlapped marginal portions of the tube blank. I provide means within the tube blank to bear or abut against the latter in opposition to the pressure thereon of the electrode 46, so as to keep the overlapped marginal portions a′ and a″ of the blank in contact with each other for the passage of current through such portions and between the electrodes.

For such purpose I have illustrated a frame and rollers within the tube blank of substantially the same construction as that described regarding frame 14, as illustrated in Figs. 8, 9 and 10. From the frame 14 a tubular arm or bar 26a is extended forwardly, in the direction of travel of the tube blank, and is connected with a frame 14' having a bore at 28' for admitting water from arm 26a into frame 14', (Fig. 8). The frame 14' is provided with a roller 13c having a portion to bear against the inner marginal portion a' of the tube blank at a position opposite the overlapped marginal portion a'' of the blank, in register with the electrode 46. By preference the roll 13c is of such configuration as not to engage the tube blank opposite the electrode 45, and said configuration is such as normally only to engage the tube blank opposite the overlapped portions a' and a'' thereof. Said roll has an annular shoulder 13d to engage the edge of marginal portion a', to guide the blank, Figs. 9 and 10. The diameter of shoulder 13d is such as normally not to engage the opposing portion of the tube blank. The frame 14' is also provided with a roller 19b to bear on the lower portion of the tube blank, said roller having an annular groove 19c to receive the shoulder 13d. Frame 14' is also provided with side rollers 20a to engage the inner sides of the tube blank in the manner described with respect to the rolls 20. In Fig. 9 the overlapped portions a' and a'' oppose the electrode 46 and the portion a'' is pressed in contact therewith by the roll 13c. The pressure of roll 13c against the blank aids in pressing the latter against both electrodes. As a portion of the tube blank travels between the electrodes and the frame 13' the overlapped marginal portions a', a'' of the blank will be squeezed firmly together between roll 13c and the electrode 46 to make required electric contact between the said portions, with the portion a'' in contact with said electrode, during which period electric current of suitable amperage will flow between the electrodes across the said overlapped portions of the tube blank to create a welding heat thereat. When the overlapped marginal portions a' and a'' of the tube blank are sufficiently heated between the electrode 46 and the roll 13c I am enabled to so compress or squeeze said overlapped portions together as to effect a weld therebetween by causing suitable pressure of said electrode and roll against said portions a' and a'' of the blank. By having the roll 13c normally opposing only the overlapped portions a' and a'' of the tube blank I am enabled to compress said portions to a desired degree, before the shoulder 13d engages the tube blank. It is desirable that the areas of the overlapping portions a' and a'' of the tube blank be not more than the combined thickness of said overlapped portions between electrode 46 and roll 13c to regulate or confine the welding area to a narrow zone laterally.

At a suitable distance from the welding place, and while the metal is still at a suitable welding temperature, I squeeze or compress the overlapped marginal portions a', a''. By utilizing sufficient pressure I reduce the combined thickness of said lapped portions substantially to the gage of the tube blank and form a uniform weld, substantially without burs or extrusions along meeting marginal portions of the blank, as illustrated in Figs. 8 and 11. I have illustrated compressing rollers for the overlapped heated portions of the tube blank, between which rollers said portions are compressed as the tube travels. The tube blank A passes through a throat or pass formed between grooved rollers 50 and 51 which are shown carried by shafts 52 and 53, that are journaled in uprights 54 on frame 1. By preference the roller 51 is adjustable toward and from the roller 50, for which purpose I have shown shaft 53 eccentrically journaled in sleeves 54 rotatively supported in bearings in the uprights 55 and retained in set position by screws 56.

The area of the throat or pass between the grooved rollers 50 and 51 is substantially that of the cross sectional area of the finished welded tube, and correspondingly greater than the area of the pass between rolls 6 and 9. Within the tube blank are roller means to serve with the roller 51 in compressing or welding down the heated overlapped marginal portions a', a'' of the blank. I have shown a roll 57 to engage the inner surface of the blank along the welding line in opposition to the roller 51, and a roll 58 to engage the lower surface of the tube blank in opposition to the roller 50, the distance between the diametrically opposing surfaces of the rolls 51 and 57 being such that the overlapped marginal portions a', a'' of the tube blank must be squeezed, such as to reduce them substantially to the gage thickness of the metal of the blank. In other words, the space between the opposing contacting portions of the roller 51 and roll 57 may correspond substantially to the gage of the metal of the blank, so that when the overlapped heated marginal portions a', a'' of the blank, having double the thickness of the gage of the latter, is forced between the roller 51 and the roll 57, such metal of double thickness will be compressed or squeezed to form a single thickness. During such compressing or squeezing of the metal the walls of the tube blank will expand outwardly, due to the flow of the metal from the overlapped portions, to form the finished welded tube to the desired diameter, since the throat between the rollers 50 and 51 is of greater transverse cross-sectional area than the throat between the electrodes and the guiding and supporting rollers 37 and 38. The rolls 57 and 58 are shown retained in position and guided by a head or block 59, shown carried by the tubular arm 26b that is attached to and extends from the frame 14'. The block or head 59 is shown provided with recesses 60 and 61 receiving the pivots 57a and 58a of the rolls 57 and 58, Fig. 8.

The tubular arm 26b is shown attached to frame 14' by screw threads and retained by clamping nut 27'. Said arm is also shown attached to the head 59 by screw threads and retained by clamping nut 27'', whereby the position of the rolls 57 and 58 may be adjusted with respect to the rollers 50 and 51. The tubular arm 26 will deliver cooling water to the rollers 57 and 58 through a bore 62 in head 59, Fig. 8.

Tube feeding rolls are indicated at 63 and 64, carried by shafts 65 and 66 journaled in uprights 67 supported by the main frame. The shafts 65 and 66 are provided with gears 68 and 69 in mesh for rotating said rollers in the same direction in unison. Desired pressure of the grooved rolls 63 and 64 upon the tube may be effected by adjusting the shaft 66 vertically in a manner described with respect to shaft 10. Either of the shafts 65 or 66 may be power driven in any suitable way.

In accordance with my invention the tube blank A, having the open seam a, is fed between the pre-setting rollers 6 and 9, whereupon the marginal portions a', a'' of the blank are offset with respect to one another radially and the portion a' is pushed under the portion a'', in overlapped relation, as in Fig. 4, and the thickness of the lap is determined. As the tube travels in the direction of the arrow x, (Fig. 1), the said overlapped marginal portions are retained in position by the guiding rollers 29 and 30, and said overlapped portions pass in contact with the electrodes, and are firmly pressed into contact between the electrode 46 and the roll 13c, whereby the electric current from the secondary of the transformer is caused to flow, with suitable amperage, from one electrode to the other through the overlapped marginal portions of the tube blank to heat said portions to a welding temperature.

The roller 13c by reason of its engagement with the inner surface of the tube blank and engagement of the shoulder 13d with the edge of the inner portion a' of the blank, the rolls 29 and 30, and the curvature of the portions of the electrodes contacting with the blank, as well as the guiding means 37 and 38 for the blank, cause retention of the blank in proper shape with the overlapping margins in contact for molding. Said margins are, therefore, heated to the desired fusing or welding degree, and while so heated said margins pass to the compressing or ironing rolls 50 and 51 where the heated overlapped margins of the blank are compressed or ironed down to a desired thickness, such as corresponding to the gage of the metal of the blank, and the welded tube is delivered in the desired shape and diameter. The operation is such that the finished tube will be welded at the lapped portion in a smooth way without undesired burs or extrusions of the metal along the previously lapped portions.

My invention is distinguished from the well known butt-welding of tubes, where the edges of the seams are abutted and so welded which usually produces burs or extrusions of the metal along the seam, both exterior and interior, requiring subsequent removal of the burs to produce a smooth appearing finish at the seam, whereby more or less waste of material has occurred, and cost has increased. In accordance with my invention there is no waste material at a seam because no burs are produced requiring removal of metal extruded during welding, and I produce a more substantial weld than is obtained in the butt-welding referred to.

This application is a division of my application filed March 10, 1930, Serial No. 434,496.

Having now described my invention what I claim is:—

1. A welding apparatus comprising means to displace a marginal portion of a blank with respect to another marginal portion thereof and causing lapping of one marginal portion against another, means to compress the lapped portions to a definite thickness, means to traverse the blank, and means to compress and heat said overlapped marginal portions while the tube is traveling.

2. An apparatus as set forth in claim 1 provided with means to compress the heated overlapped portions of the blank.

3. A welding apparatus comprising means to displace a marginal portion of a blank with respect to another marginal portion thereof and causing lapping of one marginal portion against another, means to compress the lapped portions to a definite thickness, means to traverse the blank, a pair of spaced electrodes located in position to engage the blank on opposite sides of the overlapped portions thereof, means to cause the electrodes to contact with and press the blank, and means to supply said electrodes with electric current.

4. An apparatus as set forth in claim 3 provided with means to compress the heated overlapped portions of the blank.

5. A welding apparatus comprising roller means having contacting peripheral portions of different diameters to engage a tubular metal blank having an open seam, the portion of said means having the greater diameter causing one marginal portion of the blank to be offset with respect to the other marginal portion of the blank, means to cause said marginal portions to lap one upon another, means to traverse said blank and means to heat said marginal portions of the blank and cause pressure thereof.

6. An apparatus as set forth in claim 5 provided with means to compress the overlapped heated portions of the blank.

7. A welding apparatus comprising a roller having two surface portions, one portion being of greater diameter than the other to engage a tubular blank having an open seam, means to guide said blank in contact with said roller whereby the portion of the latter having the greater diameter will displace a marginal portion of said blank inwardly with respect to an adjacent portion of the blank, guiding means to cause the displaced portion of the blank to be tucked under the adjacent marginal portion thereof, means to traverse the blank, means to heat the overlapped portions of the blank, and means to compress said portions of the blank to contact with one another for welding the heated overlapped portions together.

8. An apparatus as set forth in claim 7 provided with means to compress the heated overlapped portions of the blank.

9. A welding apparatus comprising a roller having contacting surfaces of different diameters providing an annular shoulder therebetween, guiding means for a tubular blank having an open seam to guide said blank into engagement with said roller, said guiding means and roller providing a pass between them for the blank of less cross-sectional area than the normal cross-sectional area of the blank, means to traverse the blank through said pass, whereby one portion of the roller will displace one marginal portion of the blank with respect to the adjacent marginal portion thereof and one of said portions will be tucked under the other portion, and means to compress and heat said overlapped portions of the blank as the tube travels.

10. An apparatus as set forth in claim 9 provided with means to compress the heated overlapped portions of the blank.

11. A welding apparatus comprising a roller having contacting surfaces of different diameters providing an annular shoulder therebetween, guiding means for a tubular blank having an open seam to guide said blank into engagement with said roller, said guiding means and roller providing a pass between them for the blank of less cross-sectional area than the normal cross-sectional area of the blank, means to traverse the blank through said pass, a pair of spaced electrodes insulated from each other, means to guide the blank and press the overlapped portions of the blank into contact for welding and different portions of the blank in contact with the respective electrode, and means to cause electric current to flow between the electrodes through the overlapped contacting portions of the blank.

12. An apparatus as set forth in claim 11 provided with means spaced from said electrodes to compress the heated overlapped portions of the blank.

13. A welding apparatus comprising means to overlap marginal portions of a tubular metal blank having an open seam, means to compress the lapped portions to a definite thickness, a pair of spaced electrodes insulated from each other to engage the blank on opposite sides of the edge of the outer lapped portion of the blank, and means within the blank adjacent to the electrodes to force portions of the blank into contact with said electrodes and the overlapped portions of the blank into contact with each other, and means to cause electric current to flow between the electrodes through the overlapped portions of the blank.

14. A welding machine comprising means to overlap marginal portions of a tubular blank having an open seam, a pair of spaced electrodes insulated from each other to engage the blank on opposite sides of the edge of the outer lapped portion of the blank, and means within the blank adjacent to the electrodes to force portions of the blank into contact with said electrodes and the overlapped portions of the blank into contact with each other, means to cause electric current to flow between the electrodes through the overlapped portions of the blank, a roller and means to support the same within the tube in contact with the latter, said roller opposing the overlapped portions of the blank, said roller having an annular shoulder to engage the edge of the inner lapped portion of the blank to guide the latter as it travels between the electrodes and said roller.

15. A welding apparatus comprising means to overlap marginal portions of a tubular metal blank having an open seam, a pair of spaced electrodes insulated from each other to engage the blank on opposite sides of the edge of the outer lapped portion of the blank, and means within the blank adjacent to the electrodes to force portions of the blank into contact with said electrodes and the overlapped portions of the blank into contact with each other, means to cause electric current to flow between the electrodes through the overlapped portions of the blank, and a roller opposed to the blank adjacent to the electrodes, said roller having a portion opposing the overlapped portions of the blank and one of the electrodes and having a shoulder opposing an inner edge of the blank.

16. A welding apparatus comprising means providing a pass for a tubular metal blank having an open seam, said pass being of less cross-sectional area than the cross-sectional area of the blank, said pass being provided with means to offset one marginal portion of the blank with respect to the other marginal portion thereof and lap said marginal portions one upon another, means to traverse the blank, a pair of spaced electrodes insulated from each other to engage the blank adjacent to the overlapped portions thereof, guiding means for the blank adjacent to the electrodes providing a throat having an area substantially corresponding to the area of the first named throat, means to cause contact of the overlapped portions of the blank and contact of spaced portions of the blank with said electrodes, means to cause current to flow between the electrodes through the overlapped portions of the blank, and means to compress the heated overlapped portions of the blank, said means including a throat of greater cross-sectional area than the first named throat whereby during compression of the heated overlapped portions of the blank the walls of the tube may expand to a cross-sectional area greater than that of the first named throat.

17. An electric welding machine comprising means to overlap the marginal portions of a tubular blank having an open seam, means to traverse said blank, guiding means for the blank spaced from the first named means, said guiding means including a guide and a roller providing a pass for the blank, said roller having contacting surfaces of different diameters to engage the blank and provided with an annular shoulder therebetween to engage an edge of the blank for guiding the latter, means spaced from said guiding means to heat the overlapped portions of the blank and means to press said overlapped portions into contact where heated.

18. An apparatus as set forth in claim 17 including means to compress the overlapped portions of the blank before heating said portions.

19. A welding apparatus comprising means to overlap the marginal portions of a tubular blank having an open seam, means to traverse the blank, devices to heat the overlapped marginal portions of the blank and cause contact thereof for welding, and devices to compress the heated overlapped portions of the blank, said devices including a roller to engage the outer lapped portion of the blank, a roll within the blank to engage the inner lapped portion thereof, means to retain said roller and roll spaced a distance apart less than the thickness of the overlapped portions of the blank to reduce the thickness of the overlapped portions as the blank travels between said rollers.

20. An apparatus as set forth in claim 19 including a guiding roller opposing the said compressing rollers, said rollers providing a pass for the blank of cross-sectional area substantially corresponding to the area of the welded tube.

21. An electric welding machine having a pass for a tubular metal blank having an open seam, said pass being provided with means to overlap marginal portions of said blank, means to traverse said blank, the first named means having a space for the overlapped portions of the blank of such a dimension that said means will press said overlapped portions to a definite thickness as the blank traverses through the pass and means to heat the overlapped portions for welding them.

22. An electric welding machine having a pass for a tubular metal blank having an open seam, said pass including opposed spaced rollers provided with means to overlap marginal portions of the blank, means to traverse said blank through the pass, said rollers having a space therebetween for said overlapped portions, said space being of such a dimension that said rollers will roll said overlapped portions to a definite thickness as the blank traverses through the pass and means to heat the overlapped portions for welding them.

23. An electric welding machine having a pair of spaced electrodes, means to traverse a blank having overlapped portions, means to cause contact of the blank with the electrodes, and means within the blank to guide said overlapped portions opposite one of the electrodes and to press said portions together with the outer lapped portion in contact with said electrode.

GEORGE A. LUTZ.